(12) United States Patent
Sun et al.

(10) Patent No.: US 12,358,545 B2
(45) Date of Patent: Jul. 15, 2025

(54) FOLDING CART

(71) Applicant: ZHEJIANG JIANSHENG LEISURE PRODUCTS CO., LTD, Zhejiang (CN)

(72) Inventors: Yuanru Sun, Zhejiang (CN); Chao Zeng, Zhejiang (CN); Jian He, Zhejiang (CN)

(73) Assignee: ZHEJIANG JIANSHENG LEISURE PRODUCTS CO., LTD, Zhejiang (CN)

( * ) Notice: Subject to any disclaimer, the term of this patent is extended or adjusted under 35 U.S.C. 154(b) by 512 days.

(21) Appl. No.: 17/861,239

(22) Filed: Jul. 10, 2022

(65) Prior Publication Data

US 2022/0340183 A1 Oct. 27, 2022

Related U.S. Application Data

(63) Continuation-in-part of application No. 17/137,367, filed on Dec. 30, 2020, now Pat. No. 11,932,298, (Continued)

(30) Foreign Application Priority Data

Oct. 18, 2019 (CN) .......................... 201921755041.6

(51) Int. Cl.
*B62B 3/02* (2006.01)
*B62B 5/06* (2006.01)

(52) U.S. Cl.
CPC ................ *B62B 3/02* (2013.01); *B62B 5/067* (2013.01); *B62B 2205/06* (2013.01)

(58) Field of Classification Search
CPC .......... B62B 3/02; B62B 3/007; B62B 5/067; B62B 2205/06; B62B 2205/104
See application file for complete search history.

(56) References Cited

U.S. PATENT DOCUMENTS 7,784,151 B2 * 8/2010 Chen ..................... B60B 33/025
16/35 R
8,382,149 B1 * 2/2013 Liu ....................... B62K 27/003
280/642

(Continued)

FOREIGN PATENT DOCUMENTS

| CN | 206984070 | 2/2018 |
| CN | 212074075 | 12/2020 |
| CN | 214776038 | 11/2021 |

*Primary Examiner* — Katy M Ebner
(74) *Attorney, Agent, or Firm* — JCIP GLOBAL INC.

(57) ABSTRACT

A folding cart includes a frame body and a wheel assembly located at a lower part of the frame body. A pull rod assembly is arranged on the frame body in a matched manner. The frame body includes a bottom frame assembly and a side frame assembly which can be folded or unfolded. The side frame assembly includes a plurality of side rail units and a plurality of leg tube assemblies for connecting two adjacent side rail units. Each leg tube assembly includes a leg tube body, an upper leg tube seat located at an upper part of the leg tube body, and a lower leg tube seat located at a lower part of the leg tube body. The wheel assembly includes a plurality of wheel units configured to be detachably and fixedly installed to the lower leg tube seats by first locking and fixing mechanisms.

7 Claims, 17 Drawing Sheets

Related U.S. Application Data which is a continuation-in-part of application No. PCT/CN2020/116444, filed on Sep. 21, 2020.

(56) References Cited

U.S. PATENT DOCUMENTS

| | | | |
|---|---|---|---|
| 9,056,621 B1* | 6/2015 | Jin | B62B 3/027 |
| 9,145,154 B1* | 9/2015 | Horowitz | B62B 5/0013 |
| 9,211,897 B2* | 12/2015 | Yang | B62B 3/001 |
| 9,580,095 B2* | 2/2017 | Vargas, II | B62B 3/02 |
| 9,738,298 B1* | 8/2017 | Yang | B62B 3/025 |
| 10,040,470 B1* | 8/2018 | Horowitz | B62B 3/102 |
| 10,099,711 B1* | 10/2018 | Sun | B62B 3/007 |
| 10,207,729 B2* | 2/2019 | Sun | B62B 5/065 |
| 10,399,586 B1* | 9/2019 | Huang | B62B 5/06 |
| 10,414,422 B2* | 9/2019 | Choi | B62B 9/082 |
| 10,501,103 B1* | 12/2019 | Wang | B62B 3/007 |
| 10,633,010 B1* | 4/2020 | Zhang | B62B 3/025 |
| 10,836,418 B2* | 11/2020 | Zhu | B62B 3/025 |
| 10,953,903 B1* | 3/2021 | Park | B62B 3/007 |
| 11,173,936 B1* | 11/2021 | Regev | B62B 3/108 |
| 11,225,277 B1* | 1/2022 | Sun | B62B 5/061 |
| 11,370,467 B1* | 6/2022 | Horowitz | B62B 3/007 |
| 11,465,664 B1* | 10/2022 | Choi | B62B 3/025 |
| 11,572,091 B1* | 2/2023 | Wang | B62B 5/00 |
| 2010/0090444 A1* | 4/2010 | Chen | B62B 3/106 |
| | | | 280/651 |
| 2011/0204598 A1* | 8/2011 | Stevenson | B62B 3/02 |
| | | | 280/639 |
| 2018/0297622 A1* | 10/2018 | Chen | B62B 5/0003 |
| 2018/0327011 A1* | 11/2018 | Horowitz | B62B 3/025 |
| 2019/0255882 A1* | 8/2019 | Bastien | B60B 33/045 |
| 2021/0107548 A1* | 4/2021 | Wang | B62B 3/007 |
| 2021/0114643 A1* | 4/2021 | Sun | B62B 3/02 |
| 2021/0284216 A1* | 9/2021 | Sun | B62B 3/02 |
| 2021/0300450 A1* | 9/2021 | Yang | B62B 3/025 |
| 2022/0041199 A1* | 2/2022 | Tong | B62B 3/025 |
| 2022/0340183 A1* | 10/2022 | Sun | B62B 3/025 |
| 2023/0001973 A1* | 1/2023 | Frankel | B62B 3/003 |
| 2023/0094718 A1* | 3/2023 | Zhou | B62B 3/025 |
| | | | 280/651 |
| 2024/0059332 A1* | 2/2024 | Frankel | B62B 3/12 |
| 2024/0124039 A1* | 4/2024 | Zhao | B62B 3/025 |
| 2024/0343285 A1* | 10/2024 | Yang | B62B 5/067 |

* cited by examiner

FOLDING CART

CROSS-REFERENCE TO RELATED APPLICATION

This is a continuation-in-part application of U.S. patent application Ser. No. 17/137,367, filed on Dec. 30, 2020. The prior U.S. patent application Ser. No. 17/137,367 is a continuation-in-part application of International Patent Application No. PCT/CN2020/116444, filed on Sep. 21, 2020, which claims the priority benefit of Chinese Patent Application No. 201921755041.6 filed on Oct. 18, 2019. The entirety of each of the above-mentioned patent applications is hereby incorporated by reference herein and made a part of this specification.

BACKGROUND

Technical Field

The present invention relates to the technical field of carts, in particular to a folding cart.

Description of Related Art

A hand cart is a kind of cart facilitating short-distance transportation of a small amount of goods. It is a commonly used tool in daily life, especially leisure, travel, shopping, goods delivery, and even business trips. In general, an existing portable folding cart is inconvenient to fold, store and carry, is still large in size after being folded, and cannot be maximally folded. Due to the sharp increase in logistics cost and the increasing popularity of e-commerce sales under global impact by the epidemic situation, how to achieve small-size packaging and reduce logistics costs is an issue that many companies need to solve nowadays.

For this, there are already many improvement solutions to reduce the folded size of the hand cart. For example, disclosed is a convenient-to-use folding cart with a publication number of CN212074075U, including a frame main body, a wheel assembly and a pull handle assembly, where both left and right sides of the frame main body are provided with telescopic structures capable of extending or retracting forwards and backwards, such that the frame main body can be folded or unfolded forwards and backwards. In fact, the forwards and backwards telescopic structures are a set of two cross inclined rods, and upper and lower ends are hinged to front and rear facades to form telescopic structures from the front and rear facades to middle facades.

For another example, disclosed is a gathering and folding cart with a publication number of CN206984070U, including a frame assembly, a pull rod assembly and wheels, where the pull rod assembly is arranged in front of the frame assembly. Each of side frames includes a coplanar X cross tube assembly, which includes a long inclined tube, short inclined tubes and a hollow seat. The middle of the hollow seat is provided with a long strip hole along a front-rear direction, front and rear ends of the hollow seat are respectively provided with tube joints facing in opposite directions along a vertical direction, and the long inclined tube passes through the long strip hole and has the center hinged to the middle of the long strip hole by a hinge shaft. There are two short inclined tubes, which are respectively installed in the tube joints at the front and rear ends of the hollow seat. The two short inclined tubes are arranged parallel to each other and form a cross X shape with the long inclined tube, and the long inclined tube, the two short inclined tubes and the hollow seat are all located on the same plane. This structure mainly improves the structure of cross tube fittings and the way of hinge joint. The overall structure is consistent with that in the above-mentioned prior patents. It also includes telescopic supports arranged between upper and lower support seats at four corners and matched with inner and outer guide tubes, and front and rear bottom beams hinged to a turnover seat at the center of the bottom of the cart, and the X structure can be lifted and folded from the turnover seat.

In addition, for example, disclosed is a folding cart with a publication number of CN214776038U, including a foldable cart body frame, a storage bag, wheels and a push-pull rod assembly, where front, rear, left and right facades of the cart body frame are provided with one or more sets of cross hinged inclined rods, the inclined rods on the adjacent facades have upper ends hinged to each other and lower ends hinged to hinge seats, and the wheels are installed on the hinge seats. A bottom plane of the cart body frame is supported by two folding rod sets distributed in a left-right manner, each of the folding rod sets includes a front rod piece, a rear rod piece and a bridging piece, the bridging piece connects one end of the front rod piece to one end of the rear rod piece, and the other end of the front rod piece and the other end of the rear rod piece are correspondingly hinged to the hinge seats of the front facade and the rear facade. The hinge seats are correspondingly formed with horizontal grooves, and when the cart body frame is opened in place, the front and rear rod pieces are locally placed in the horizontal grooves and jacked, and the hinge seats are corrected by guidance. The present invention features unique conception, simple structure and smooth operation.

However, in existing structural designs, there are technical defects as follows. 1. Wheel body portions of existing folding carts are all of structures directly fixed to frames, include wheel bodies which are inconvenient to disassemble and need to be locked and fixed by using many tools and part of which cannot be disassembled, account for a relatively large proportion of the folding carts, and cannot be rapidly assembled or disassembled in existing designs. 2. Telescopic rod structures are often used as pull rod structures in the existing folding carts, causing their telescopic and folding actions to be more complicated, and also affecting the packaging size. 3. In general, rectangular frame structures are used as existing frame structures, such that after the frames are folded, upper and lower sizes are same. Due to the folding interference between rod pieces, a top inner cavity usually has a relatively large gap cavity, which makes the overall packaging size relatively large.

SUMMARY

An objective of the present invention is to provide a folding cart, which is used to solve the above technical problems. Under the condition of ensuring that the folding cart remains unchanged in capacity and size after being unfolded, the present invention can further reduce the overall folded packaging size, and can facilitate rapid assembly, thereby reducing the logistics cost of a product.

In order to solve the technical problems, the present invention can adopt the following technical solution.

A folding cart includes a frame body and a wheel assembly located at a lower part of the frame body. A pull rod assembly is arranged on the frame body in a matched manner. The frame body includes a bottom frame assembly and a side frame assembly which can be folded or unfolded. The side frame assembly includes a plurality of side rail units and a plurality of leg tube assemblies for connecting two adjacent side rail units. Each of the leg tube assemblies includes a leg tube body, an upper leg tube seat located at an upper part of the leg tube body, and a lower leg tube seat located at a lower part of the leg tube body. The wheel assembly includes a plurality of wheel units, and the wheel units are configured to be detachably and fixedly installed to the lower leg tube seats of the leg tube assemblies by first locking and fixing mechanisms.

Each of the first locking and fixing mechanisms includes a first locking block and a first reset piece. The lower leg tube seat is formed with a locking groove and a first through hole, and the locking groove is configured to be installed in cooperation with the first locking block. The first locking block is formed with a second through hole. The first reset piece is installed on a side wall of the locking groove, and is configured to reset the first locking block. Each of the wheel units includes a wheel body, a wheel fork seat installed in cooperation with the wheel body, and a locking rod installed on the wheel fork seat. the locking rod is provided with a locking portion which can be locked and fixed or disengaged by the first locking block.

When the locking rod and the lower leg tube seat are locked and fixed by corresponding one of the first locking and fixing mechanisms the locking portion is located at an upper part of the first locking block, and the first locking block stops on a disengagement path of the locking portion. When the locking rod and the lower leg tube seat are unlocked by the corresponding first locking and fixing mechanism, the first locking block is moved to connect the second through hole and the first through hole in an up-down manner, and the locking portion can be disengaged outwards through the second through hole.

The first through hole includes a leg tube accommodating cavity, a locking rod accommodating cavity and a locking accommodating cavity. An inner diameter of the locking accommodating cavity is larger than an inner diameter of the locking rod accommodating cavity. The locking rod penetrates through the locking accommodating cavity and the locking rod accommodating cavity, and extends into the leg tube accommodating cavity to be installed in cooperation with a leg tube sleeve, and the leg tube sleeve is installed at a lower end part of the leg tube body in an embedded manner.

The pull rod assembly includes a pull rod body, a pull rod seat and connecting rods. Each of the connecting rods has one end hingedly matched with the pull rod seat and the other end hingedly matched with the lower leg tube seat of the corresponding one of the leg tube assemblies. The pull rod seat is installed on the pull rod body in a sleeved manner, and is movable along the pull rod body. The pull rod seat is provided with a second locking and fixing mechanism, and is matchable with the pull rod body in a locked and fixed manner by the second locking and fixing mechanism.

The pull rod body is formed with at least one locking hole. The second locking and fixing mechanism includes a second locking block and a second reset piece. The second locking block is formed with a pull rod through hole. A side wall of the pull rod through hole is provided with a pull rod locking block configured to match with the locking hole. The pull rod body penetrates the pull rod through hole.

Upper parts between two adjacent side rail units are installed in cooperation by a connecting seat, and the connecting seat is suspended at an upper part of the leg tube assembly and is adjacent to a central area relative to the upper leg tube seat. When the frame body is in a folded state, an upper folded size of the side frame assembly is smaller than a lower folded size of the side frame assembly.

The upper leg tube seat is hingedly provided with reinforcing rods, and ends of the reinforcing rods are configured to be hingedly matched with the corresponding side rail units.

The side rail units include two first side rail units and two second side rail units. The two first side rail units are arranged in a front-rear manner, and the two second side rail units are arranged in a left-right manner. The first side rail units and the second side rail units are adjacently installed in a matched manner. Each of the first side rail units includes two first side rods hingedly matched in an "X" shape, each of the second side rail units includes at least one set of second side rail bodies, each of the second side rail bodies includes two second side rods hingedly matched in an "X" shape, and the two adjacent second side rail bodies are installed in a matched manner by a hinge seat.

The bottom frame assembly includes a central seat and a plurality of bottom frame rods. The bottom frame rods have one ends hingedly matched with the central seat and the other ends hingedly matched with the lower leg tube seats. When the frame body changes from an unfolded state to a folded state, the central seat is gradually arched upwards, and the bottom frame rods gradually change from a horizontal state to an erected state and drive the lower leg tube seats to be folded towards the center.

Compared with the prior art, the present invention has the following outstanding advantages and effects. By the optimized design, the present invention has a quick disassembly and assembly structure by using the wheel assembly and the frame body, which can reduce the overall packaging size, and is convenient for a user to quickly assemble and disassemble, fold or unfold the cart in use. By the optimized design of the structure of the frame body and the design of suspended connecting structures at upper parts of the side rail units, the size of an upper part of the frame body is reduced, and the folding cart is more compact in size and space after being folded. The pull rod assembly is optimized to facilitate the telescopic storage of a pull rod, thereby reducing the overall packaging size. In conclusion, under the condition of ensuring that the folding cart remains unchanged in capacity and size after being unfolded, the present invention can further reduce the overall folded packaging size, and can facilitate rapid assembly, thereby reducing the logistics cost of a product.

The features of the present invention can be clearly understood from the drawings and the detailed description of the preferred embodiments as follows.

DESCRIPTION OF THE EMBODIMENTS

Figure 1:
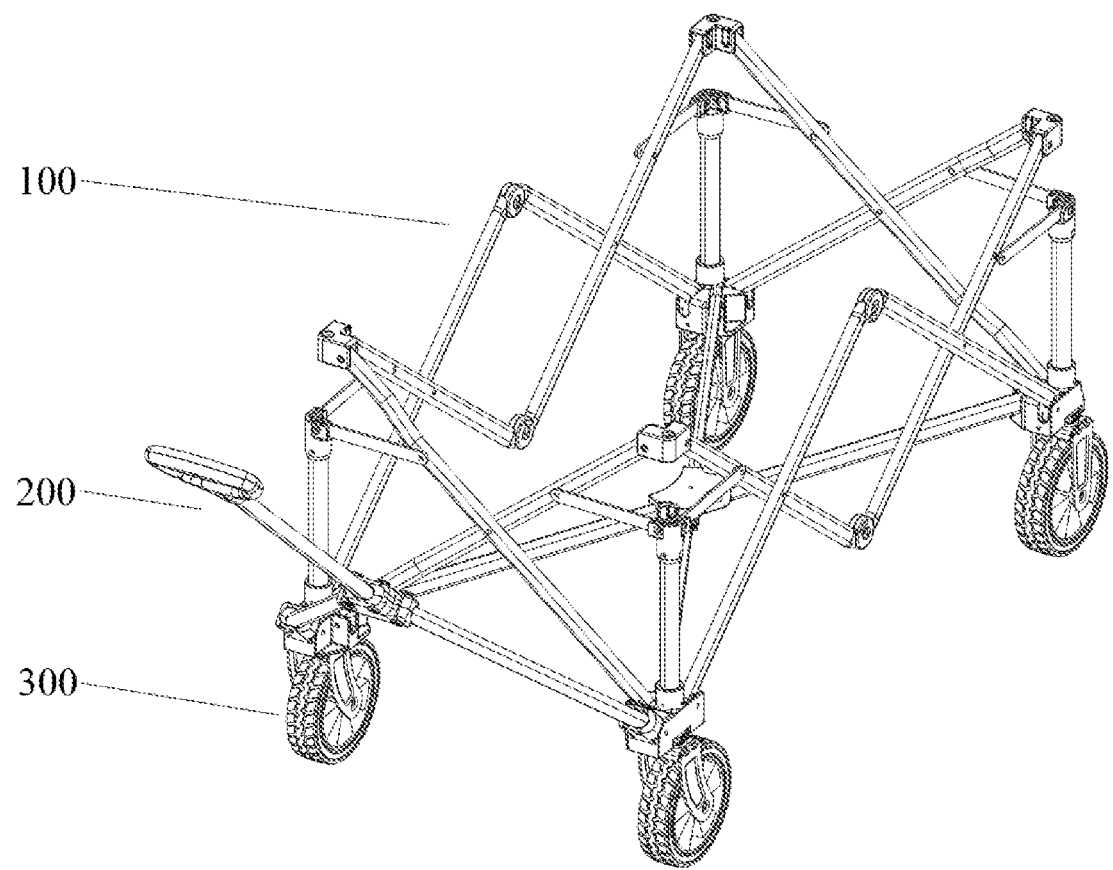
FIG. 1 is a first schematic diagram of an overall structure of the present invention.
Figure 2:
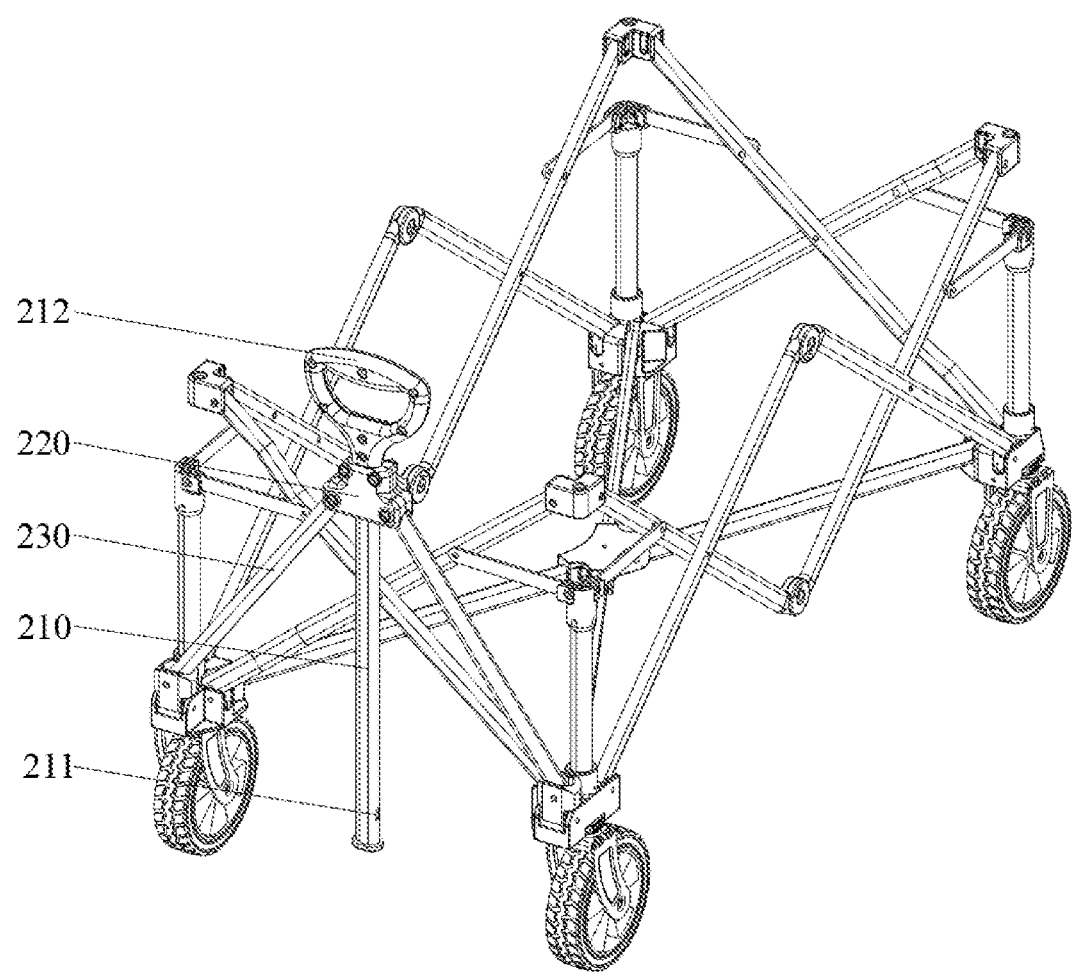
FIG. 2 is a second schematic diagram of the overall structure of the present invention.
Figure 3:
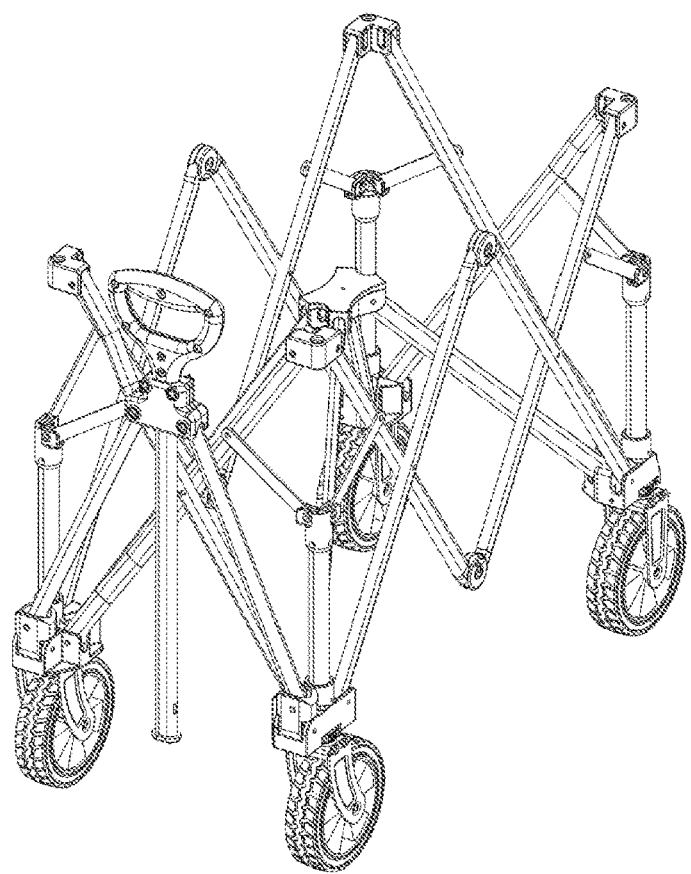
FIG. 3 is a third schematic diagram of the overall structure of the present invention.
Figure 4:
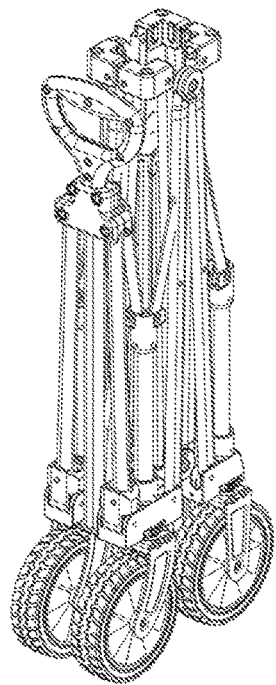
FIG. 4 is a fourth schematic diagram of the overall structure of the present invention.
Figure 5:
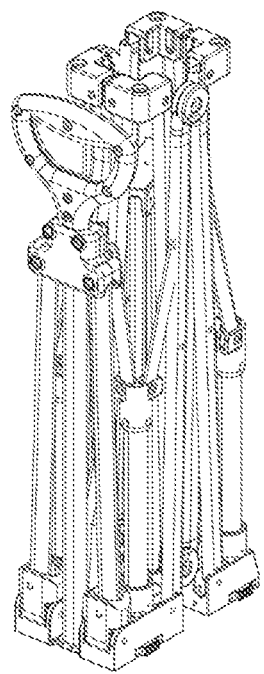
FIG. 5 is a schematic diagram of a folded structure after the disassembly of an entire wheel assembly in the present invention.
Figure 6:
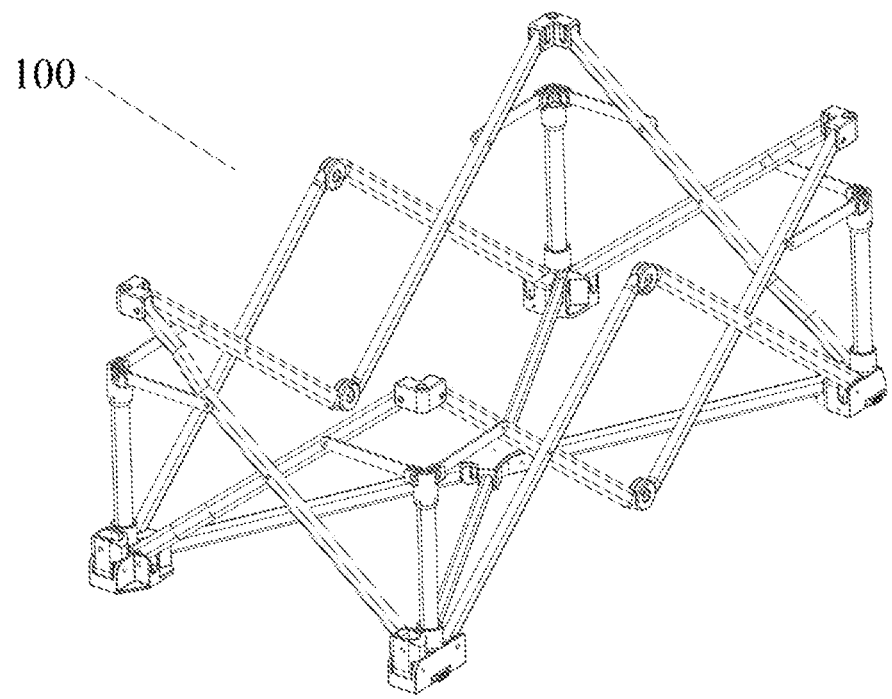
FIG. 6 is a schematic structural diagram of a frame body in the present invention.
Figure 7:
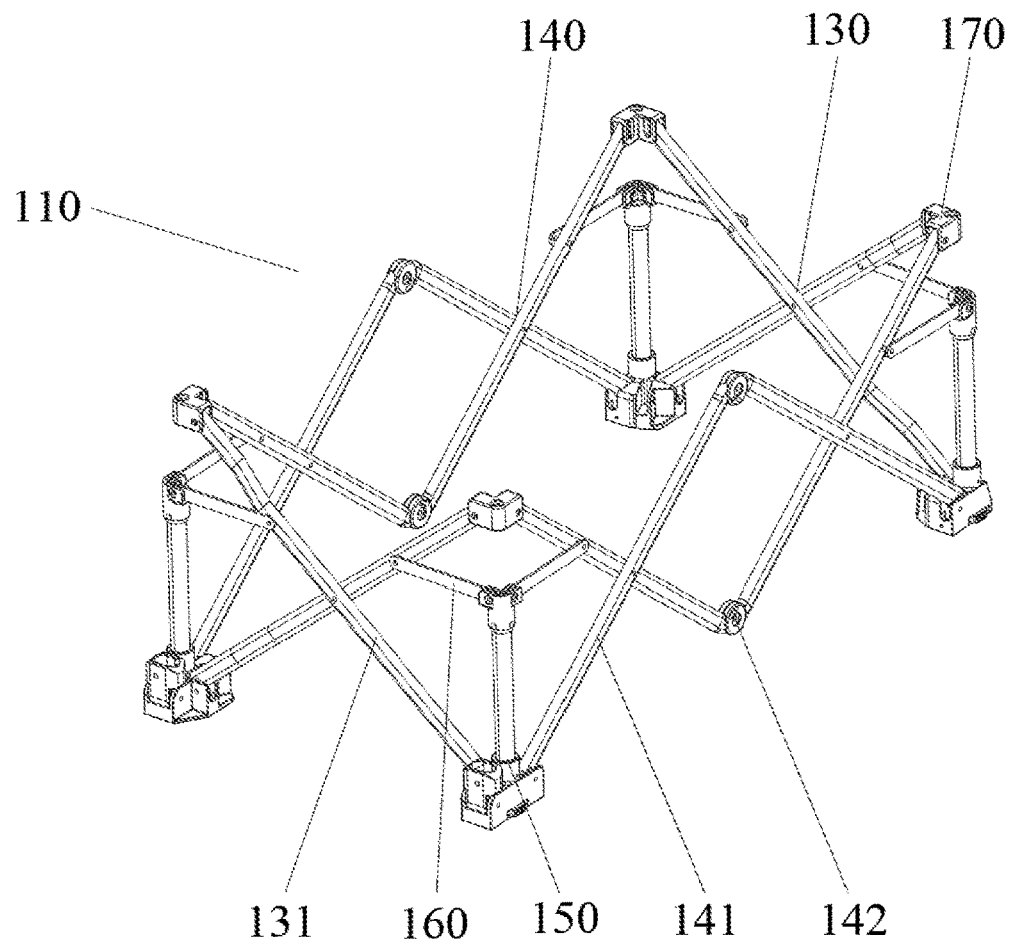
FIG. 7 is a schematic structural diagram of a side frame assembly in the present invention.
Figure 8:
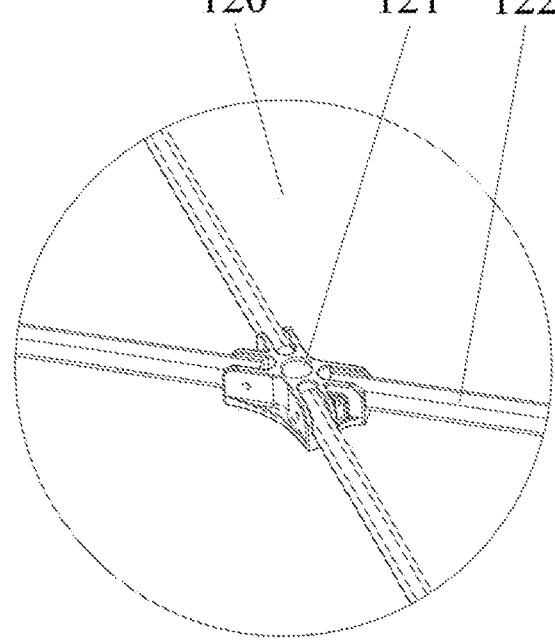
FIG. 8 is a schematic structural diagram of a bottom frame assembly in the present invention.
Figure 9:
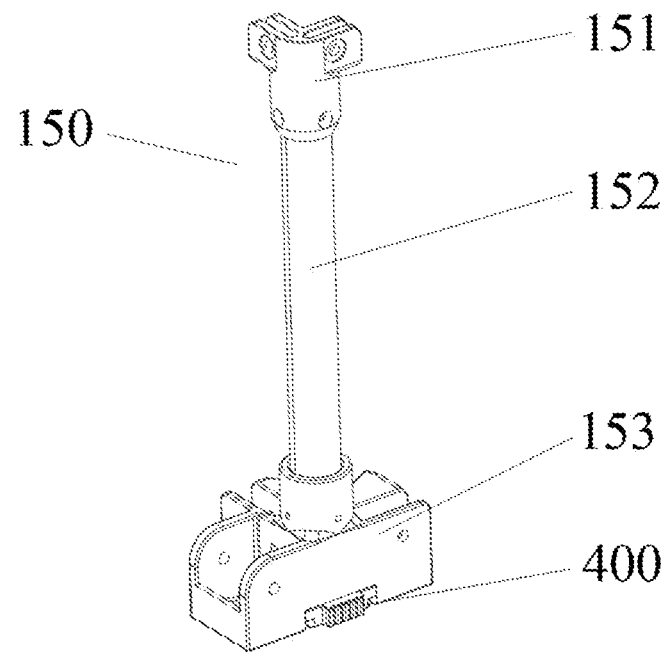
FIG. 9 is a schematic structural diagram of a leg tube assembly in the present invention.
Figure 10:
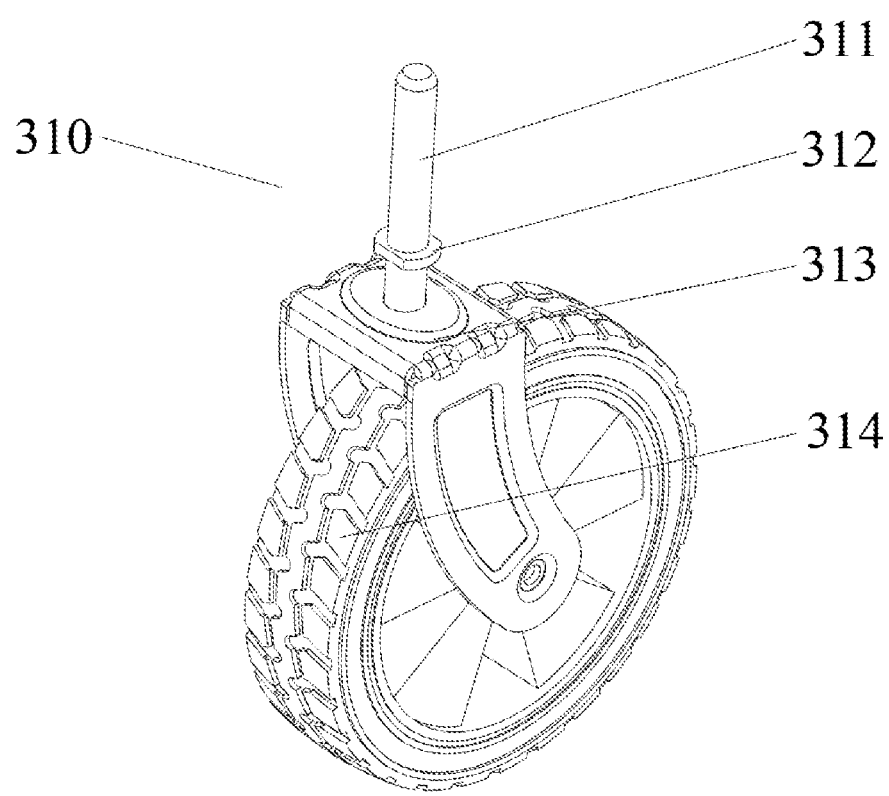
FIG. 10 is a schematic structural diagram of a wheel unit in the present invention.
Figure 11:
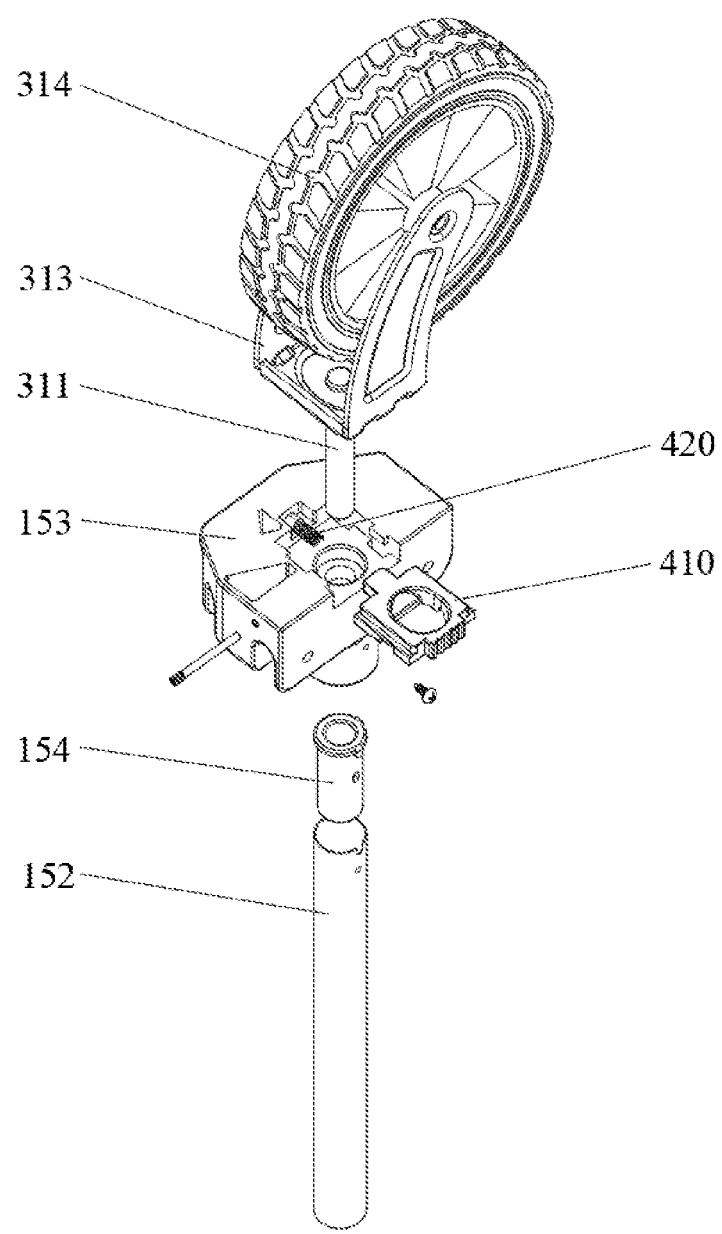
FIG. 11 is a schematic diagram of exploded structures of the wheel unit and the leg tube assembly in the present invention.
Figure 12:
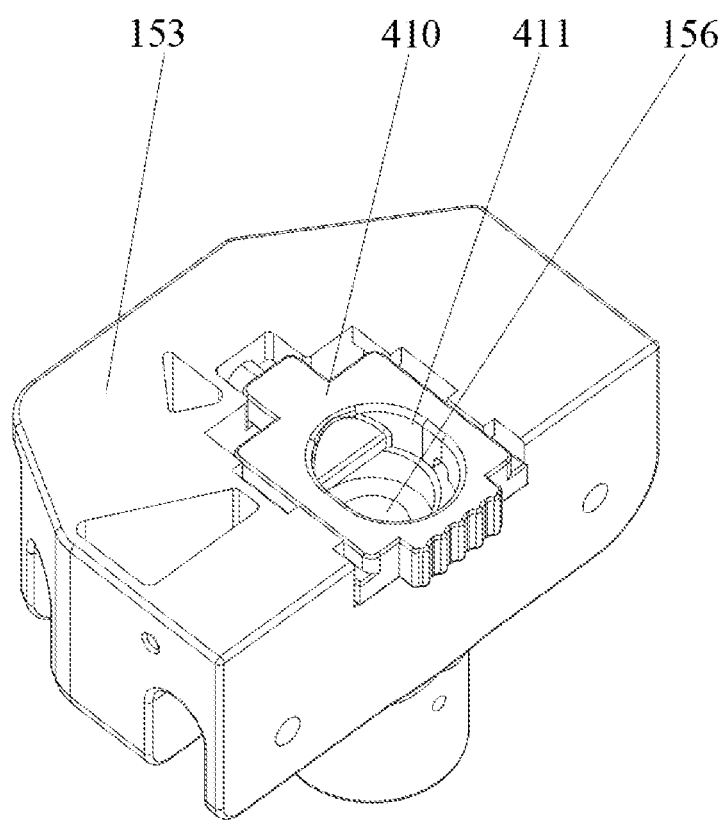
FIG. 12 is a schematic diagram of installation structures of a lower leg tube seat and a first locking and fixing mechanism in the present invention.
Figure 13:
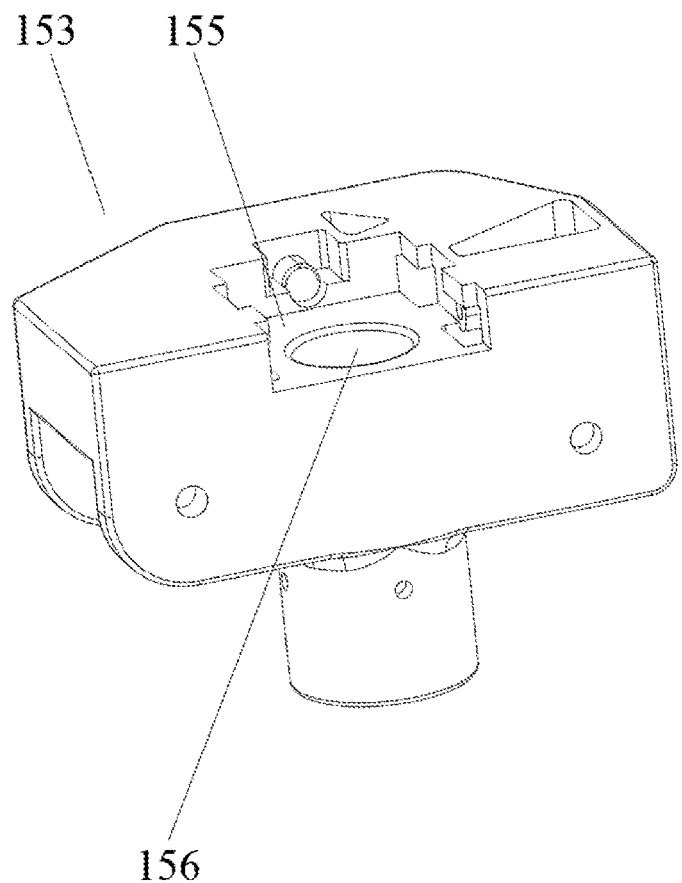
FIG. 13 is a schematic structural diagram of the lower leg tube seat in the present invention.
Figure 14:
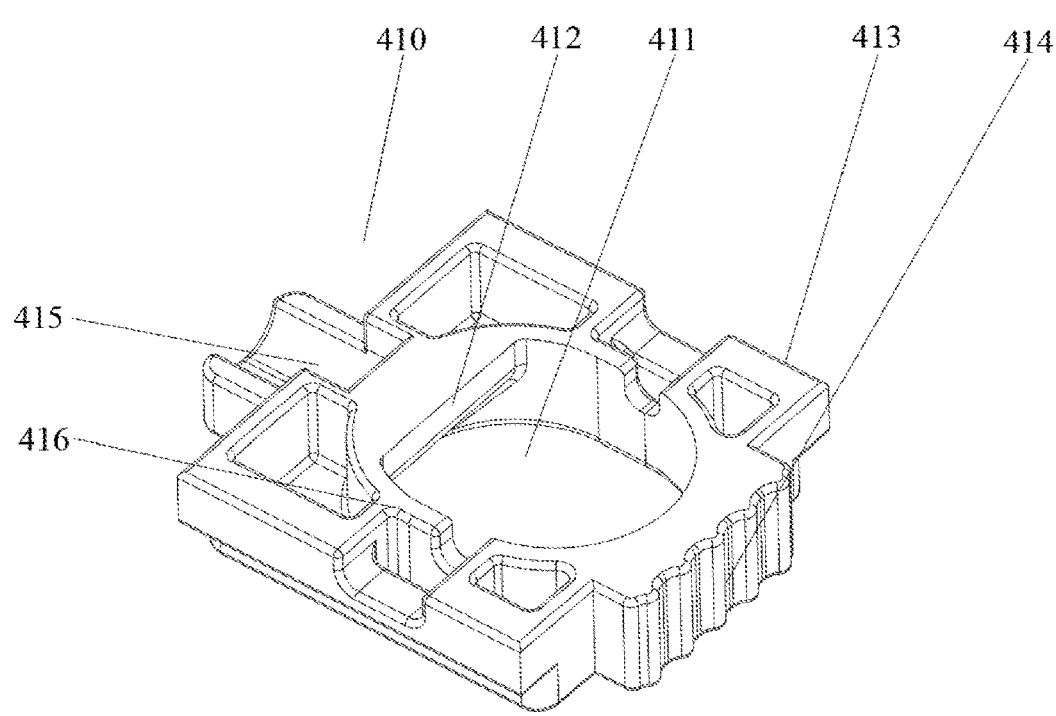
FIG. 14 is a first schematic structural diagram of a first locking block in the present invention.
Figure 15:
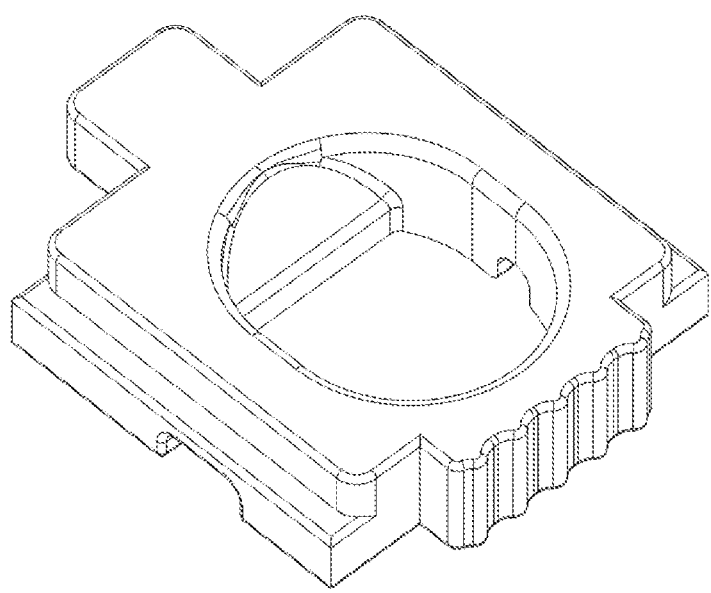
FIG. 15 is a second schematic structural diagram of the first locking block in the present invention.
Figure 16:
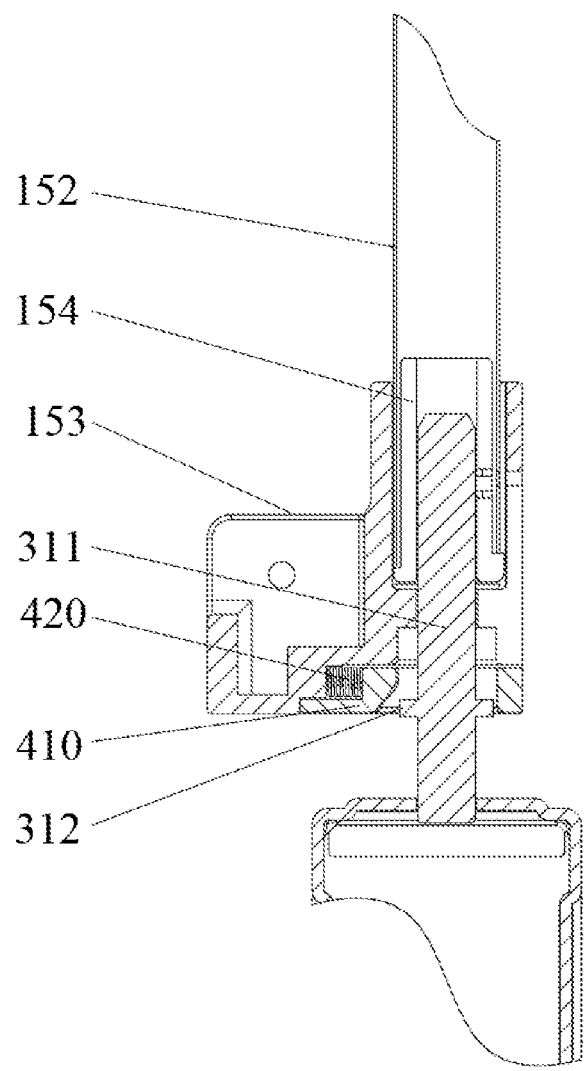
FIG. 16 is a first schematic diagram of cross-sectional structures of the wheel unit and the leg tube assembly in the present invention.
Figure 17:
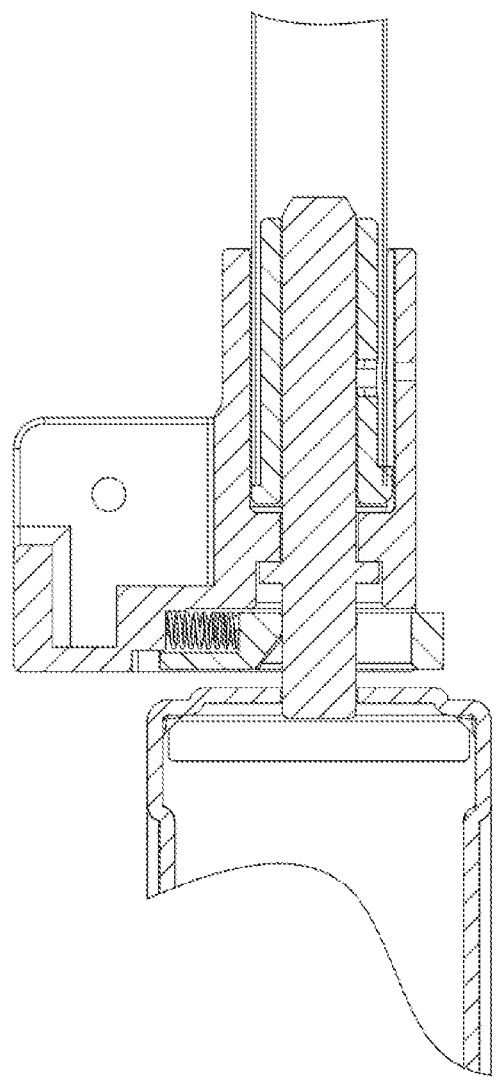
FIG. 17 is a second schematic diagram of cross-sectional structures of the wheel unit and the leg tube assembly in the present invention.
Figure 18:
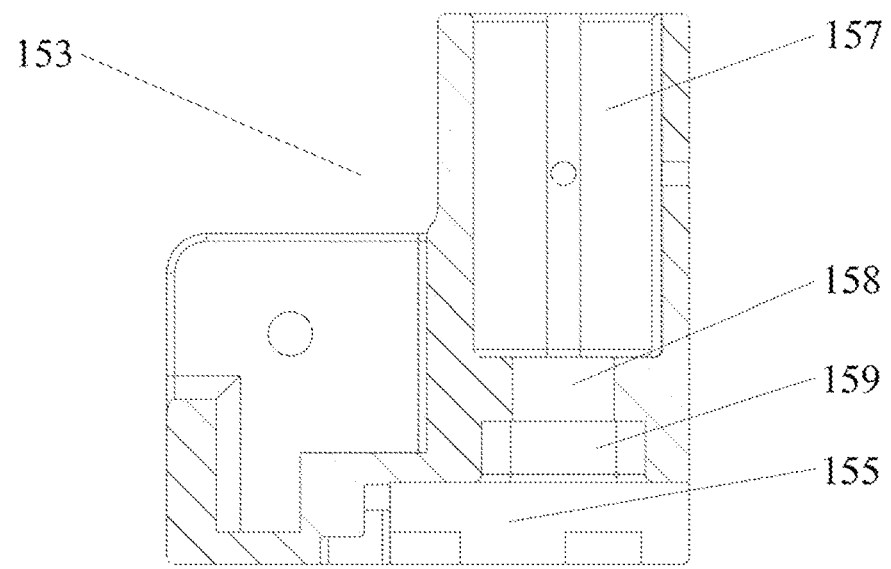
FIG. 18 is a schematic diagram of a cross-sectional structure of the lower leg tube seat in the present invention.

In order to make the technical means, creative features, achievement goals and effects achieved by the present invention easy to understand, the present invention is further described below in conjunction with specific illustrations.

As shown in FIG. 1 to FIG. 24, a folding cart provided by the present invention includes a frame body 100 and a wheel assembly 300 located at a lower part of the frame body 100. The frame body 100 includes a bottom frame assembly 120 and a side frame assembly 110, and the bottom frame assembly 120 and the side frame assembly 110 can be folded or unfolded. The side frame assembly 110 includes a plurality of side rail units and a plurality of leg tube assemblies 150 for connecting two adjacent side rail units.

In a preferred embodiment, the side rail units include two first side rail units 130 and two second side rail units 140. The two first side rail units 130 are arranged in a front-rear manner, and the two second side rail units 140 are arranged in a left-right manner. The first side rail units 130 and the second side rail units 140 are adjacently installed in a matched manner. Each of the first side rail units 130 includes two first side rods 131 hingedly matched in an "X" shape, each of the second side rail units 140 includes at least one set of second side rail bodies, each of the second side rail bodies includes two second side rods 141 hingedly matched in an "X" shape, and the two adjacent second side rail bodies are installed in a matched manner by a hinge seat 142. There are 4 leg tube assemblies 150, which are respectively installed between the first side rail units 130 and the second side rail units 140. The frame body 100 is of a rectangular structure as a whole. Each of the leg tube assemblies 150 includes a leg tube body 152, an upper leg tube seat 151 located at an upper part of the leg tube body 152, and a lower leg tube seat 153 located at a lower part of the leg tube body 152.

In combination with the above structure, an upper part between the two adjacent side rail units is installed in a matched manner by a connecting seat 170, and the connecting seat 170 is suspended at an upper part of the leg tube assembly 150 and is close to a central area relative to the upper leg tube seat 151. When the frame body 100 is in a folded state, the folded size of an upper part of the side frame assembly 110 is smaller than the folded size of a lower part thereof. The upper leg tube seat 151 is hingedly provided with reinforcing rods 160, and the other ends of the reinforcing rods 160 are configured to be hingedly matched with the corresponding side rail units. The connecting seat 170 and the upper leg tube seat 151 are always in a separated state, and this structural design is optimally adopted, such that the side frame assembly 110 will not be disturbed with the leg tube assembly 150 during the folding, an upper area of the side frame assembly 110 can be maximally folded after folding, the size of an inner cavity of the frame body 100 is not disturbed during the unfolding, the cavity of the original size is ensured, and the overall packaging size is reduced; and meanwhile, the structural design of the reinforcing rods 160 is further added, where the reinforcing rods 160 are hingedly matched with upper parts of the first side rods 131 and the second side rods 141 in general, and when the frame body 100 is in a fully unfolded state, the reinforcing rods 160 are usually in a horizontal state, and this structural design can enhance the overall stability of the frame body 100 and also facilitates the folding or unfolding of the side rail units.

The bottom frame assembly 120 includes a central seat 121 and a plurality of bottom frame rods 122. The bottom frame rods 122 have one ends hingedly matched with the central seat 121 and the other ends hingedly matched with the lower leg tube seats 153. When the frame body 100 changes from an unfolded state to a folded state, the central seat 121 is gradually arched upwards, and the bottom frame rods 122 gradually change from a horizontal state to an erected state and drive the lower leg tube seats 153 to be folded towards the center. The structure of the bottom frame assembly 120 is optimized, where there are preferably 4 bottom frame rods 122, which are scattered around the central seat 121, and have the other ends respectively configured to be connected with the lower leg tube seats 153. The structural design that the central seat 121 is arched upwards is optimally adopted, such that the bottom frame assembly 120 can be conveniently folded, and when the frame body 100 is in an unfolded state, the load-bearing capacity of the bottom frame assembly 120 can be improved. Depending on different specifications and sizes of folding carts, central seats 121 and bottom frame rods 122 of the folding carts can be structurally designed in two sets or other arrangements.

Figure 19:
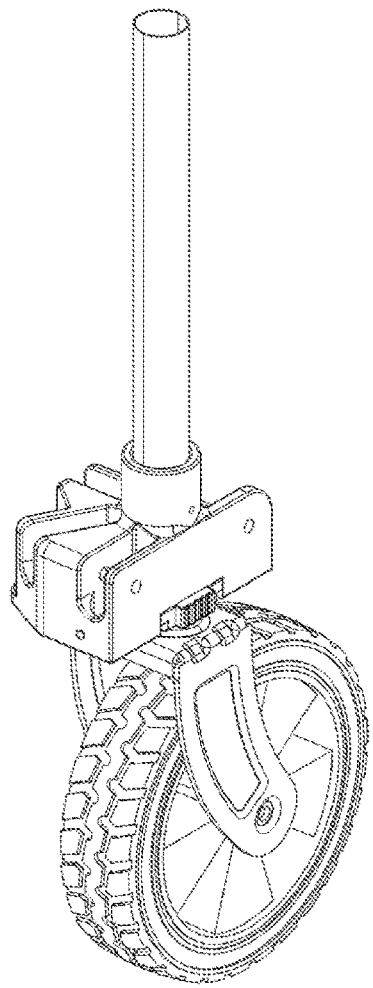
FIG. 19 is a first schematic diagram of installation structures of the wheel unit and the leg tube assembly in the present invention.
Figure 20:
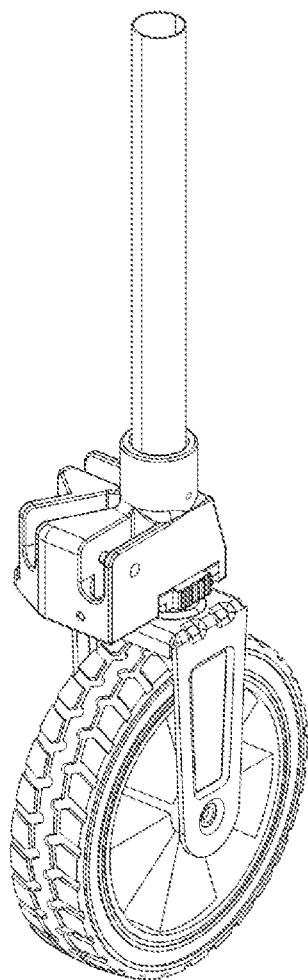
FIG. 20 is a second schematic diagram of the installation structures of the wheel unit and the leg tube assembly in the present invention.
Figure 21:
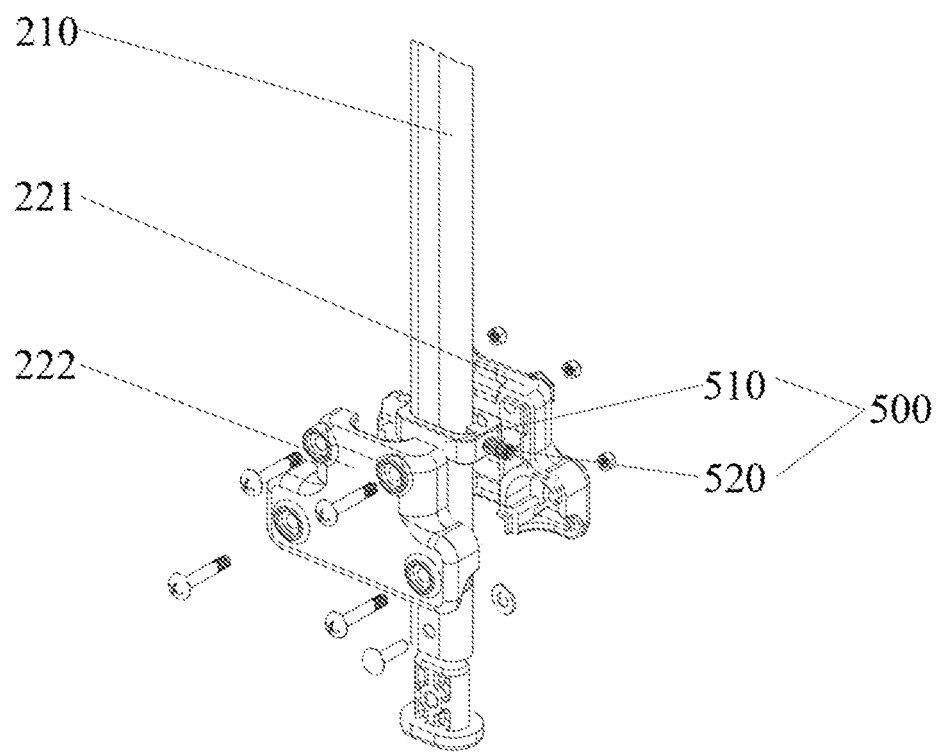
FIG. 21 is a schematic diagram of exploded structures of a pull rod assembly and a second locking and fixing mechanism in the present invention.
Figure 22:
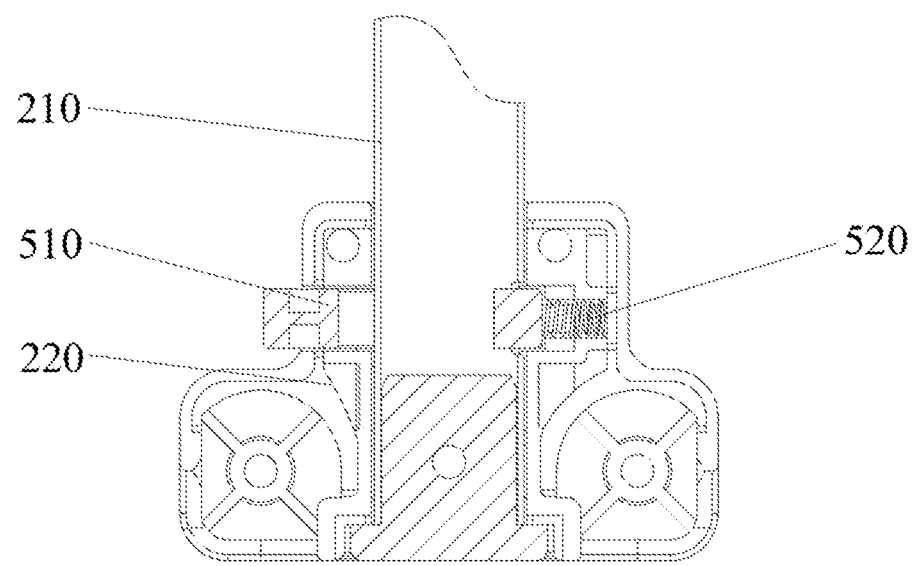
FIG. 22 is a first schematic diagram of cross-sectional structures of the pull rod assembly and the second locking and fixing mechanism in the present invention.
Figure 23:
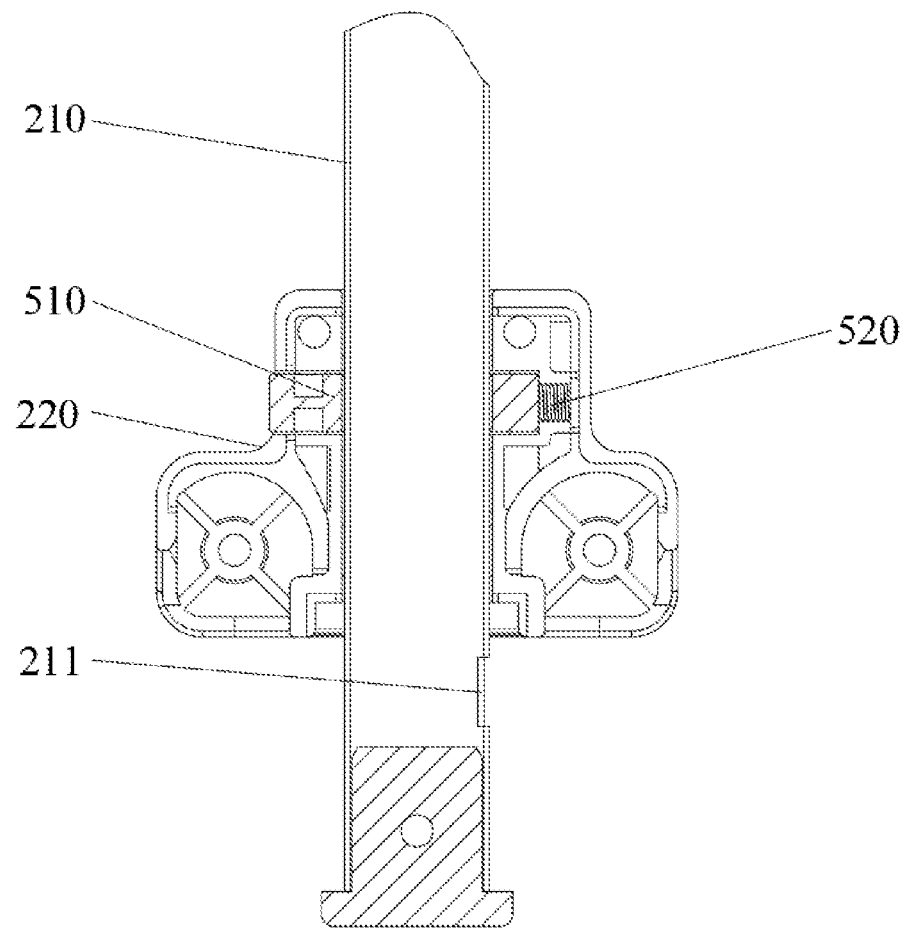
FIG. 23 is a second schematic diagram of cross-sectional structures of the pull rod assembly and the second locking and fixing mechanism in the present invention.
Figure 24:
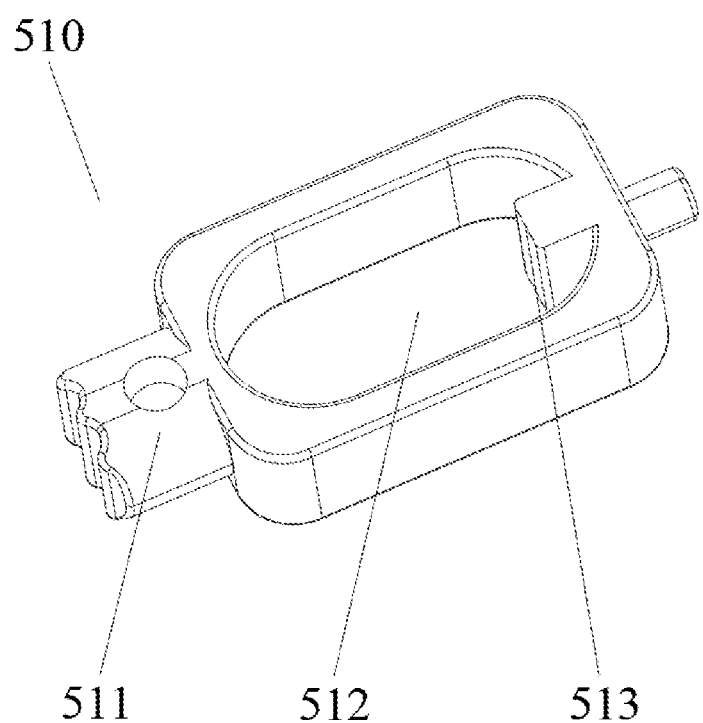
FIG. 24 is a schematic structural diagram of a second locking block in the present invention.

Based on the above, in this embodiment, the wheel assembly 300 includes a plurality of wheel units 310 usually with the number of 4. The wheel units 310 are configured to be detachably and fixedly installed to the lower leg tube seats 153 by first locking and fixing mechanisms 400. Each of the wheel units 31 includes a wheel body 314, a wheel fork seat 313 installed in cooperation with the wheel body 314, and a locking rod 311 installed on the wheel fork seat 313. The locking rod 311 is provided with a locking portion 312, and the locking portion 312 can be locked and fixed or disengaged by a first locking block 410. The structure of the locking portion 312 can be designed with structures such as an outer convex ring, an inner concave ring groove, an outer convex clamping block, an inner concave clamping groove, etc. According to the structures of folding carts of different specifications, the positions and structures of hinge grooves, configured for hinged cooperation, of the lower leg tube seats 153 can be correspondingly adjusted. As shown in FIG. 19 and FIG. 20, there are matching installation structures of lower leg tube seats 153 of two different specifications.

The wheel assembly 300 can be quickly assembled or disassembled by using the first locking and fixing mechanisms 400. During the transportation of a product, the wheel assembly 300 can be disassembled, such that the wheel assembly 300 can be individually packaged or placed in other packaging areas. Thus, the overall packaging size is reduced, and the overall package of the product is more compact and reasonable.

In a preferred embodiment, each of the first locking and fixing mechanisms 400 includes a first locking block 410 and a first reset piece 420. The lower leg tube seat 153 is formed with a locking groove 155 and a first through hole 156, and the locking groove 155 is configured to be installed in cooperation with the first locking block 410. The first locking block 410 is formed with a second through hole 411. The first reset piece 420 is installed on a side wall of the locking groove 155, and the first reset piece 420 is configured to reset the first locking block 410. A reset spring is preferably used as the first reset piece 420, which can also be designed with structures such as a tension spring, a reset push rod, etc., and facilitates the automatic reset of the first locking block 410. In the specific structure, the first locking block 410 includes a pressing portion 414, a reset piece abutting portion 415 and a locking block body portion 416, where the second through hole 411 is preferably located in a central area of the locking block body portion 416, side tracks 413 are usually arranged on two sides of the locking block body portion 416, and side track grooves are formed in corresponding positions of the locking groove 155 to facilitate the radial movement of the first locking block 410 along the locking groove.

When the locking rod 311 and the lower leg tube seat 153 are locked and fixed by the corresponding first locking and fixing mechanism 400, the locking portion 312 is located at an upper part of the first locking block 410, and the first locking block 410 stops on a disengagement path of the locking portion 312. In the specific structure, a side wall of the second through hole 411 is optimally provided with a clamping and locking block 412 for limiting and locking with the locking portion 312, where the clamping and locking block 412 is usually of an inclined table structure. During the cooperation with the locking portion 312, the locking portion 312 can contact an inclined surface to move the first locking block 410, and until the locking portion 312 is disengaged from the inclined surface and continues to move up, the first locking block 410 is reset by the first reset piece 420 to complete rapid assembly. At this time, an upper table surface of the clamping and locking block 412 usually contacts with a lower surface of the locking portion 312 to achieve locking.

When the wheel units 310 need to be disassembled, in a case where the locking rods 311 and the lower leg tube seats 153 are unlocked by the first locking and fixing mechanisms 400, the first locking blocks 410 are moved to connect the second through holes 411 and the first through holes 156 in an up-down manner, and the locking portions 312 can be disengaged outwards by the second through holes 411. A user squeezes the pressing portions 414 to move the first locking blocks 410 inwards, such that the clamping and locking blocks 412 continue to move inwards until edge positions of the clamping and locking blocks 412 and outer edge positions of the locking portions 312 are spaced apart from each other. At this time, the first through holes 153 and the second through holes 411 are connected, and the locking portions 312 can be disengaged outwards by the second through holes 411, thereby completing rapid disassembly of the wheel units 310.

Further, in this embodiment, the first through hole 156 includes a leg tube accommodating cavity 157, a locking rod accommodating cavity 158 and a locking accommodating cavity 159. The locking rod 311 penetrates through the locking accommodating cavity 159 and the locking rod accommodating cavity 158, and extends into the leg tube accommodating cavity 157 to be installed in cooperation with a leg tube sleeve 154. The leg tube sleeve 154 is installed at a lower end part of the leg tube body 152 in an embedded manner. The leg tube accommodating cavity 157 is configured to cooperate with the lower end part of the leg tube body 152, which facilitates the installation and fixation of the lower leg tube seat 153 and the leg tube body 152. The locking rod accommodating cavity 158 is convenient for the locking rod 311 to penetrate through, and the locking rod is installed in cooperation with the leg tube sleeve 154 to be integrally fixed to the leg tube body 152. The locking accommodating cavity 159 is configured to cooperate with the locking portion 132, and the inner diameter of the locking accommodating cavity 159 is optimally designed to be larger than the inner diameter of the locking rod accommodating cavity 158, such that the locking portion 132 can be limited, the locking rod 311 and the leg tube body 152 can be positioned during the assembly and fixation, and thus the accuracy of assembly and the convenience of installation are improved.

In a preferred embodiment, the frame body 100 is provided with a pull rod assembly 200 in a matched manner. The pull rod assembly 200 includes a pull rod body 210, a pull rod seat 220 and connecting rods 230. The connecting rods 230 have one ends hingedly matched with the pull rod seat 220 and the other ends hingedly matched with the corresponding lower leg tube seats 153. The pull rod seat 220 is installed on the pull rod body 210 in a sleeved manner, and the pull rod seat 220 is movable along the pull rod body 210. The pull rod seat 220 is provided with a second locking and fixing mechanism 500, and the pull rod seat 220 is matchable with the pull rod body 210 in a locked and fixed manner by the second locking and fixing mechanism 500. The pull rod body 210 is formed with at least one locking hole 211. In another embodiment, there is one locking hole 211 located in a lower part of the pull rod body 210. In other embodiments, there are 2 or 3 locking holes 211 respectively located in an upper part and a lower part or an upper part, a middle and a lower part of the pull rod body 210. In addition, the number of locking holes 211 can be increased as needed to facilitate the adjustment of the telescopic position of the pull rod body 210.

The pull rod seat 220 includes a first seat shell 221 and a second seat shell 222, and the second locking and fixing mechanism 500 includes a second locking block 510 and a second reset piece 520, where the first seat shell 221 and the second seat shell 222 are installed in combination, and an accommodating cavity for accommodating and installing the second locking and fixing mechanism 500 is formed inside. The second reset piece 520 has one end abutting on a side wall of an inner cavity after the combination of the first seat shell 221 or/and the second seat shell 222, and the other end matched with the second locking block 510 in an abutting manner. Part of the second locking block 510 preferably protrudes outwards to facilitate pressing operation of the user. The second locking block 510 is formed with a pull rod through hole 512, a side wall of the pull rod through hole 512 is provided with a pull rod locking block 513, the pull rod locking block 513 is configured to cooperate with the locking hole, and the pull rod body 210 penetrates through the pull rod through hole 512. In general, the second locking block 510 is also provided with a pressing portion 511, and the pressing portion 511 usually protrudes from the pull rod seat 220 to facilitate the pressing operation of the user during use.

The pull rod assembly 200 is convenient for the user to pull the folding cart. Preferably, a pull rod handle 212 is arranged at an upper end of the pull rod body 210, thereby being convenient for the user to pull, and facilitating the movement of the folding cart. Usually, the user can pull out the pull rod body 210 by different lengths along the pull rod through hole 512 as needed. The length of the pull rod body can be determined by direct locking of the locking hole 211 and the pull rod locking block 513.

In addition, the design that the second locking and fixing mechanism 500 is used in the pull rod assembly 200 is optimized, such that the pull rod body 210 can be maximally folded when the folding cart is being folded.

Based on the above, the first locking and fixing mechanisms 400 and the second locking and fixing mechanism 500 may also be locking and fixing mechanisms commonly used in the prior art, such as a bayonet return spring structure, a rotary locking structure, a trigger locking structure, etc.

By the optimized design, the present invention has a quick disassembly and assembly structure by using the wheel assembly and the frame body, which can reduce the overall packaging size, and is convenient for the user to quickly assemble and disassemble, fold or unfold the cart in use. By the optimized design of the structure of the frame body and the design of suspended connecting structures at upper parts of the side rail units, the size of an upper part of the frame body is reduced, and the folding cart is more compact in size and space after being folded. The pull rod assembly is optimized to facilitate the telescopic storage of a pull rod, thereby reducing the overall packaging size. In conclusion, under the condition of ensuring that the folding cart remains unchanged in capacity and size after being unfolded, the present invention can further reduce the overall folded packaging size, and can facilitate rapid assembly, thereby reducing the logistics cost of a product.

In the present invention, the term "a plurality of" refers to two or more, unless otherwise expressly defined. As used herein, the term "and/or" includes any and all combinations of one or more associated listed items. The terms such as "installed", "connected", "connection", "fixed", etc., should be understood in a broad sense. For example, the "connection" may be a fixed connection, a detachable connection, or an integral connection, and the "connected" may be directly connected, or indirectly connected by an intermediate medium. For those of ordinary skill in the art, the specific meanings of the above terms in the present invention may be understood according to specific circumstances.

It should be noted that when an element is referred to as being "assembled on", "installed on", "fixed to" or "arranged on" another element, it can be directly on another element or an intermediate element may also be present. When an element is considered to be "connected" to another element, it can be directly connected to another element or an intermediate element may be present at the same time. The terms "vertical", "horizontal", "upper", "lower", "left", "right" and similar expressions used herein are only for the purpose of description, and do not represent the only embodiment.

In the description of this specification, the description of the terms such as "an embodiment", "some embodiments", "specific embodiments", etc. means that particular features, structures, materials or characteristics described in combination with the embodiment or example are included in at least one embodiment or example of the invention. In this specification, schematic representations of the above terms do not necessarily refer to the same embodiment or instance. Furthermore, the particular features, structures, materials or characteristics described may be properly combined in any one or more of embodiments or examples.

Although the embodiments of the present invention have been shown and described, it will be understood by those skilled in the art that various changes, modifications, substitutions and transformations can be made to these embodiments without departing from the principle and spirit of the present invention, and the scope of the invention is defined by the claims and their equivalents.

What is claimed is:

1. A folding cart, comprising a frame body and a wheel assembly located at a lower part of the frame body, wherein a pull rod assembly is arranged on the frame body in a matched manner; the frame body comprises a bottom frame assembly and a side frame assembly, and the bottom frame assembly and the side frame assembly is able to be folded or unfolded; the side frame assembly comprises a plurality of side rail units and a plurality of leg tube assemblies for connecting adjacent two of the side rail units; each of the leg tube assemblies comprises a leg tube body, an upper leg tube seat located at an upper part of the leg tube body, and a lower leg tube seat located at a lower part of the leg tube body; and the wheel assembly comprises a plurality of wheel units, and the wheel units are configured to be detachably and fixedly installed to the lower leg tube seats of the leg tube assemblies by first locking and fixing mechanisms, wherein the pull rod assembly comprises a pull rod body, a pull rod seat and connecting rods; each of the connecting rods has one end hingedly matched with the pull rod seat and the other end hingedly matched with the lower leg tube seat of the corresponding one of the leg tube assemblies; the pull rod seat is installed on the pull rod body in a sleeved manner, and the pull rod seat is movable along the pull rod body; and the pull rod seat is provided with a second locking and fixing mechanism, and the pull rod seat is matchable with the pull rod body in a locked and fixed manner by the second locking and fixing mechanism, the pull rod body is formed with at least one locking hole; the second locking and fixing mechanism comprises a second locking block and a second reset piece; the second locking block is formed with a pull rod through hole; a side wall of the pull rod through hole is provided with a pull rod locking block, and the pull rod locking block is configured to match with the locking hole; and the pull rod body penetrates the pull rod through hole, upper parts between the adjacent two of the side rail units are installed in cooperation by a connecting seat, and the connecting seat is suspended at an upper part of the leg tube assembly and is adjacent to a central area relative to the upper leg tube seat; and when the frame body is in a folded state, an upper folded size of the side frame assembly is smaller than a lower folded size of the side frame assembly.

2. The folding cart according to claim 1, wherein each of the first locking and fixing mechanisms comprises a first locking block and a first reset piece; the lower leg tube seat is formed with a locking groove and a first through hole, and the locking groove is configured to be installed in cooperation with the first locking block; the first locking block is formed with a second through hole; the first reset piece is installed on a side wall of the locking groove, and the first reset piece is configured to reset the first locking block; each of the wheel units comprises a wheel body, a wheel fork seat installed in cooperation with the wheel body, and a locking rod installed on the wheel fork seat; and the locking rod is provided with a locking portion, and the locking portion is able to be locked and fixed or disengaged by the first locking block.

3. The folding cart according to claim 2, wherein when the locking rod and the lower leg tube seat are locked and fixed by the corresponding one of the first locking and fixing mechanisms, the locking portion is located at an upper part of the first locking block, and the first locking block stops on a disengagement path of the locking portion; and when the locking rod and the lower leg tube seat are unlocked by the corresponding one of the first locking and fixing mechanisms, the first locking block is moved to connect the second through hole and the first through hole in an up-down manner, and the locking portion is able to be disengaged outwards through the second through hole.

4. The folding cart according to claim 3, wherein the first through hole comprises a leg tube accommodating cavity, a locking rod accommodating cavity and a locking accommodating cavity; an inner diameter of the locking accommodating cavity is larger than an inner diameter of the locking rod accommodating cavity; the locking rod penetrates through the locking accommodating cavity and the locking rod accommodating cavity, and extends into the leg tube accommodating cavity to be installed in cooperation with a leg tube sleeve; and the leg tube sleeve is installed at a lower end part of the leg tube body in an embedded manner.

5. The folding cart according to claim 1, wherein the upper leg tube seat is hingedly provided with reinforcing rods, and ends of the reinforcing rods are configured to be hingedly matched with the corresponding side rail units.

6. The folding cart according to claim 5, wherein the side rail units comprise two first side rail units and two second side rail units; the two first side rail units are arranged in a front-rear manner, and the two second side rail units are arranged in a left-right manner; the first side rail units and the second side rail units are adjacently installed in a matched manner; each of the first side rail units comprises two first side rods hingedly matched in an "X" shape; each of the second side rail units comprises at least one set of second side rail bodies; each of the second side rail bodies comprises two second side rods hingedly matched in an "X" shape; and adjacent two of the second side rail bodies are installed in a matched manner by a hinge seat.

7. The folding cart according to claim 6, wherein the bottom frame assembly comprises a central seat and a plurality of bottom frame rods the bottom frame rods have one ends hingedly matched with the central seat and the other ends hingedly matched with the lower leg tube seats; and when the frame body changes from an unfolded state to the folded state, the central seat is gradually arched upwards, and the bottom frame rods gradually change from a horizontal state to an erected state and drive the lower leg tube seats to be folded towards a center.

\* \* \* \* \*